(12) United States Patent
Guarino et al.

(10) Patent No.: US 11,258,316 B2
(45) Date of Patent: Feb. 22, 2022

(54) STATOR FREE END RETAINER

(71) Applicant: FORD GLOBAL TECHNOLOGIES, LLC, Dearborn, MI (US)

(72) Inventors: William David Guarino, Dearborn, MI (US); Michael Coury, Farmington Hills, MI (US); Kenneth Gerard Kraft, Warren, MI (US); Peter Alexander Szpara, Livonia, MI (US); Siraj Siddiqui, Lasalle (CA); Cyrille Goldstein, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 319 days.

(21) Appl. No.: 16/593,148

(22) Filed: Oct. 4, 2019

(65) Prior Publication Data

US 2021/0104921 A1    Apr. 8, 2021

(51) Int. Cl.
*H02K 1/18* (2006.01)
*H02K 15/14* (2006.01)
*H02K 15/02* (2006.01)

(52) U.S. Cl.
CPC .............. *H02K 1/18* (2013.01); *H02K 15/02* (2013.01); *H02K 15/14* (2013.01)

(58) Field of Classification Search
CPC ........... H02K 1/18; H02K 15/02; H02K 15/14
USPC ................ 310/402, 403, 405, 413, 415
See application file for complete search history.

(56) References Cited

U.S. PATENT DOCUMENTS

| 9,966,805 B2 | 5/2018 | Lee | |
|---|---|---|---|
| 10,749,402 B2 | 8/2020 | Ohashi et al. | |
| 2014/0265683 A1* | 9/2014 | Hossain | H02K 5/08 310/89 |
| 2020/0144885 A1* | 5/2020 | Kitamura | H02K 5/225 |

FOREIGN PATENT DOCUMENTS

| EP | 3490107 | | 5/2019 |
|---|---|---|---|
| JP | 2006060954 A | * | 3/2006 |
| JP | 2007221854 A | * | 8/2007 |
| JP | 2019088160 A | * | 6/2019 |

\* cited by examiner

*Primary Examiner* — Jose A Gonzalez Quinones
(74) *Attorney, Agent, or Firm* — David B. Kelley; Brooks Kushman, P.C.

(57) ABSTRACT

A motor for an electric vehicle includes a motor housing for receiving a stator. A plurality of caps each have an outer rim and a washer portion defining a bolt receiving opening. The outer rim of each of the caps is press-fit into the receptacles in the motor housing. The caps are each attached to the stator by one of the bolts. The heads of the bolts clamp the cap to the stator to retain one end of the stator. The outer rim holds the cap in the motor housing while the washer portion flexes axially in response to thermal expansion and contraction of the motor housing. A method is disclosed for assembling the stator into the motor housing.

20 Claims, 5 Drawing Sheets

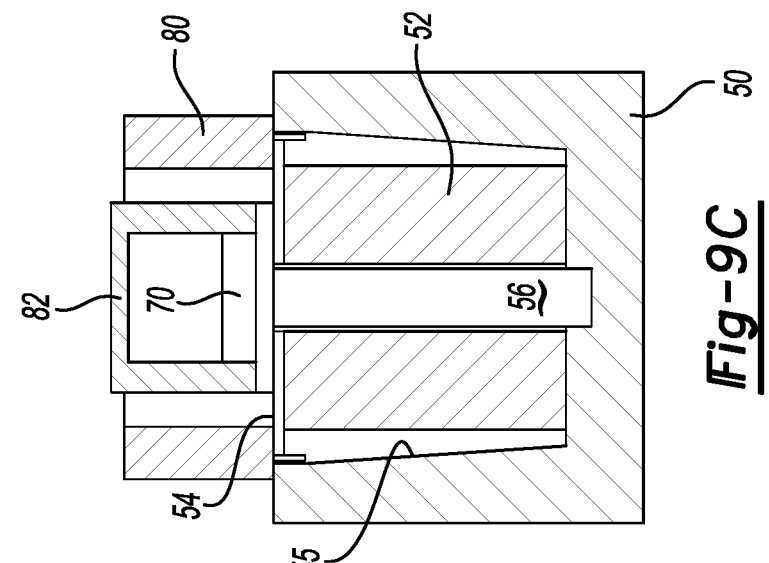
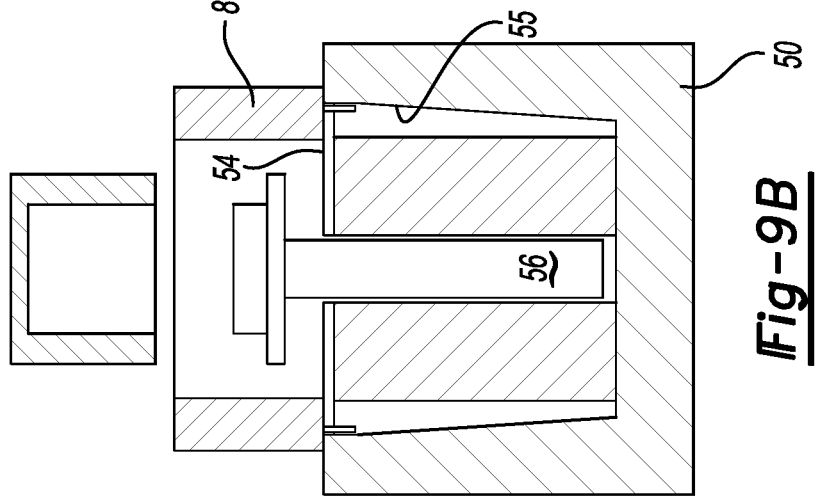
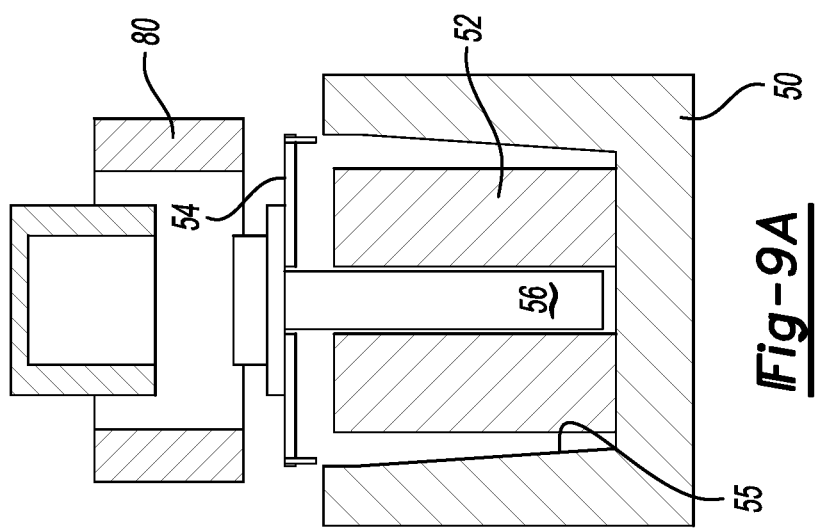

STATOR FREE END RETAINER

TECHNICAL FIELD

This disclosure relates to a retainer for the free end of an electric motor stator for an electric vehicle.

BACKGROUND

Vehicles having an electric motor for propulsion of the vehicle are designed to maximize range and provide good noise, vibration and harshness (NVH) performance. Prior stator mounting designs that use bolts to directly attach the stator to the motor housing maximize range but may experience NVH caused by the stator twisting in the opposite radial direction relative to the housing. To improve NVH performance, the stator may be shrink fit to the housing, but this approach results in reduced motor efficiency and range.

This disclosure is directed to solving the above problems and other problems as summarized below.

SUMMARY

According to one aspect of this disclosure, a motor for an electric vehicle is disclosed that comprises a motor housing defining a cavity for receiving a stator. A plurality of caps each have an outer rim and a washer portion defining a bolt receiving opening. The outer rim of the caps are each attached to one of the plurality of receptacles in the motor housing. The caps are each attached to the stator by one of the bolts. The heads of the bolts clamp the cap to the stator to frictionally retain one end of the stator. The outer rim holds the cap in the motor housing while the washer portion flexes axially in response to thermal expansion and contraction of the motor housing.

According to another aspect of this disclosure, an electric vehicle is disclosed that includes a propulsion motor for the vehicle. The motor includes a housing and a stator. The housing defines receptacles for receiving a bolt. Several caps each have an outer rim and a washer portion defining a bolt receiving opening. The outer rims of the caps are each attached to one of the openings in the housing and the caps are each attached to the stator by the bolts. The heads of the bolts clamp the caps to the stator to frictionally retain one end of the stator. The outer rim holds the cap in the motor housing while the washer portion flexes axially in response to thermal expansion and contraction of the housing.

According to other aspects of this disclosure as it relates to either a motor or an electric vehicle described above, each outer rim may include a partially cylindrical wall, and the bolt receiving openings may be concentric with the partially cylindrical wall. The partially cylindrical wall and the washer portion may be truncated on one side of each cap to define an edge that is adapted to engage the stator.

A first clearance may be provided between each bolt receiving opening and each of the bolts. A second clearance may be provided between each bolt and the openings. The first clearance between the bolt receiving openings and each of the bolts is provided to accommodate misalignment between the stator and the motor housing to prevent the caps from tilting the stator off-center.

Each cap may flex into one of the plurality of receptacles while the heads of the bolts maintain a clamp load against the stator. The bolt heads frictionally engage an external surface of one of the washer portions and an inner surface of each of the washer portions frictionally engages the stator.

According to another aspect of this disclosure, a method is disclosed for assembling a motor. According to the method, a stator is assembled into a motor housing that defines a cavity and several threaded holes. Several bolts are assembled to several caps that each define a bolt receiving opening. The bolts and caps are assembled into stator mounting openings provided on the stator. Each of the stator caps are pressed into one of the stator mounting openings with a press. The caps are secured to the stator by tightening the bolts into one of the threaded holes in the motor housing.

According to other aspects of the method, during the securing step, the press holds the caps against the motor housing. The caps may be press-fit inside the stator mounting openings. The bolts have a head that frictionally engages an external surface of one of the caps. An inner surface of the caps frictionally engages the stator. The caps may be shaped on one side to define an edge that conforms to part of a side of the stator. A first clearance may be provided between the bolt receiving openings and the bolts, and a second clearance may be provided between the bolts and the stator mounting openings. The first clearance between the cap openings and the bolts is provided to accommodate misalignment between the stator and the motor housing and prevents the cap from tilting the stator off-center.

The above aspects of this disclosure and other aspects will be described below with reference to the attached drawings.

BRIEF DESCRIPTION OF THE DRAWINGS

FIG. 9A-9C are diagrammatic cross-section views of a method of assembling a stator to a motor housing with a retainer cap and a bolt.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
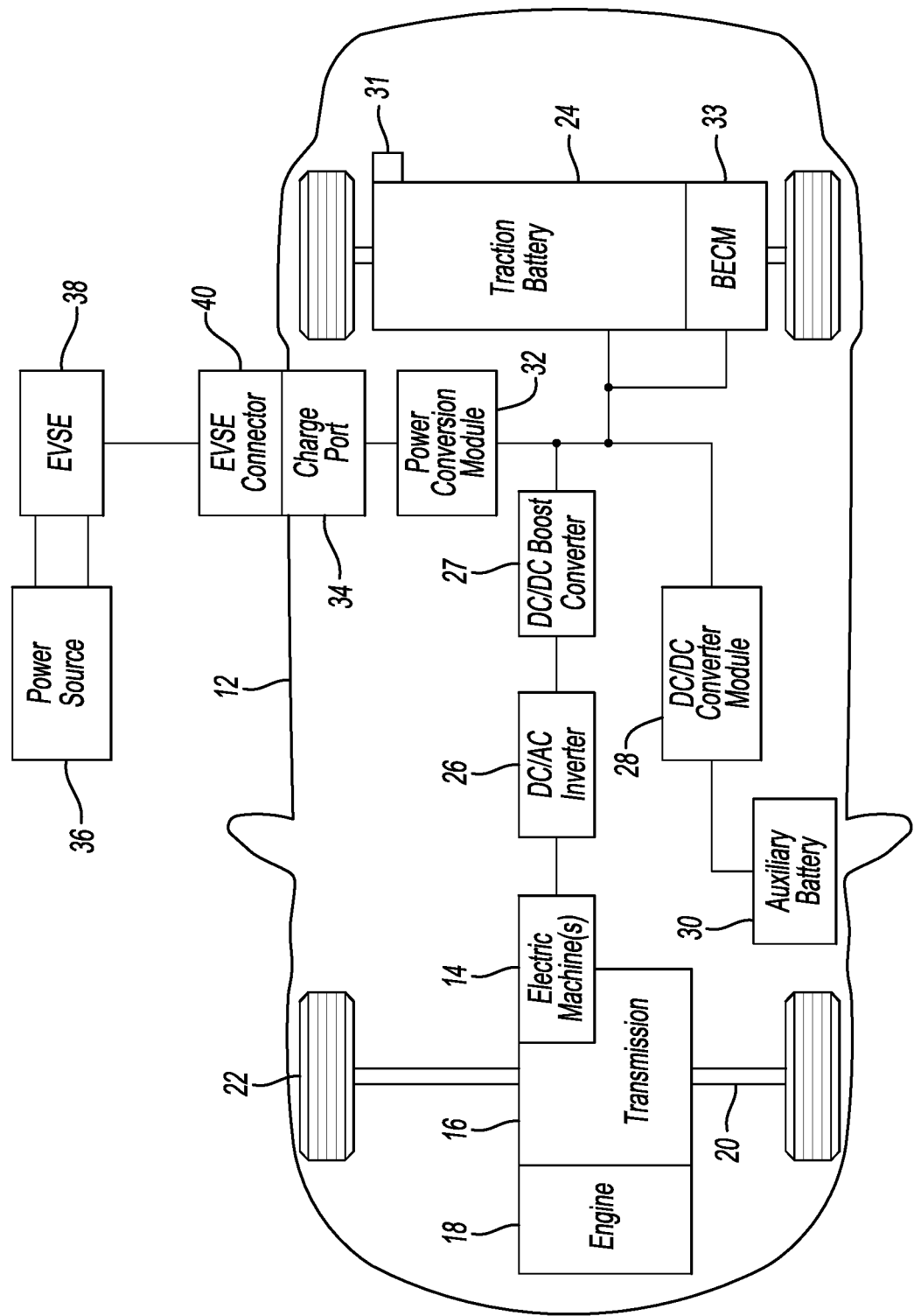
FIG. 1 is a schematic diagram illustrating an example of an electrified vehicle.

FIG. 1 illustrates a schematic diagram illustrating an example of an electrified vehicle. In this example, the electrified vehicle is a plug-in electric vehicle referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 may provide propulsion and slowing capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 stores energy that may be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors may isolate the traction battery 24 from other components when opened and may connect the traction battery 24 to other components when closed. The DC/AC inverter 26 is also electrically connected to the electric machines 14 and provides an ability to bi-directionally transfer electrical energy between the traction battery 24 and the electric machines 14. For example, a typical traction battery 24 may provide a DC voltage while the electric machines 14 may require a three-phase AC voltage to function. The DC/AC inverter 26 may convert the DC voltage to a three-phase AC voltage as required by the electric machines 14. In a regenerative mode, the DC/AC inverter 26 may convert the three-phase AC voltage from the electric machines 14 acting as generators to the DC voltage required by the traction battery 24. The inductor can also be applied to a DC/DC boost converter 27 that is optional but may be used to boost the traction battery voltage to a higher voltage level. For a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The DC/DC power converter module may function as a boost converter capable of providing multiple levels of inductive output for either plug-in or hybrid electric vehicles. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

Figure 2:
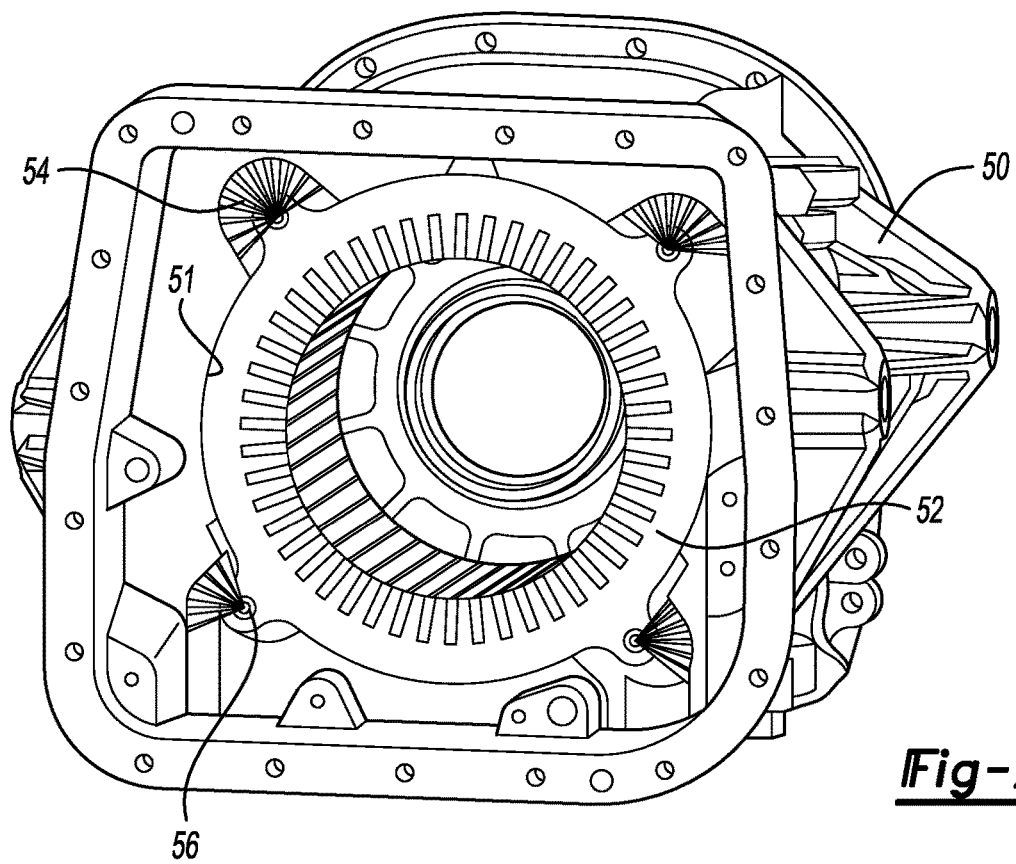
FIG. 2 is a perspective view of an electric motor housing and stator made according to one aspect of this disclosure

Referring to FIG. 2, an electric motor housing 50 is shown with a stator 52 secured within a cavity 51 defined by the housing 50 by four retainer caps 54. The illustrated example is a non-limiting example and that three or another number of retainer caps could be utilized.

Figure 3:
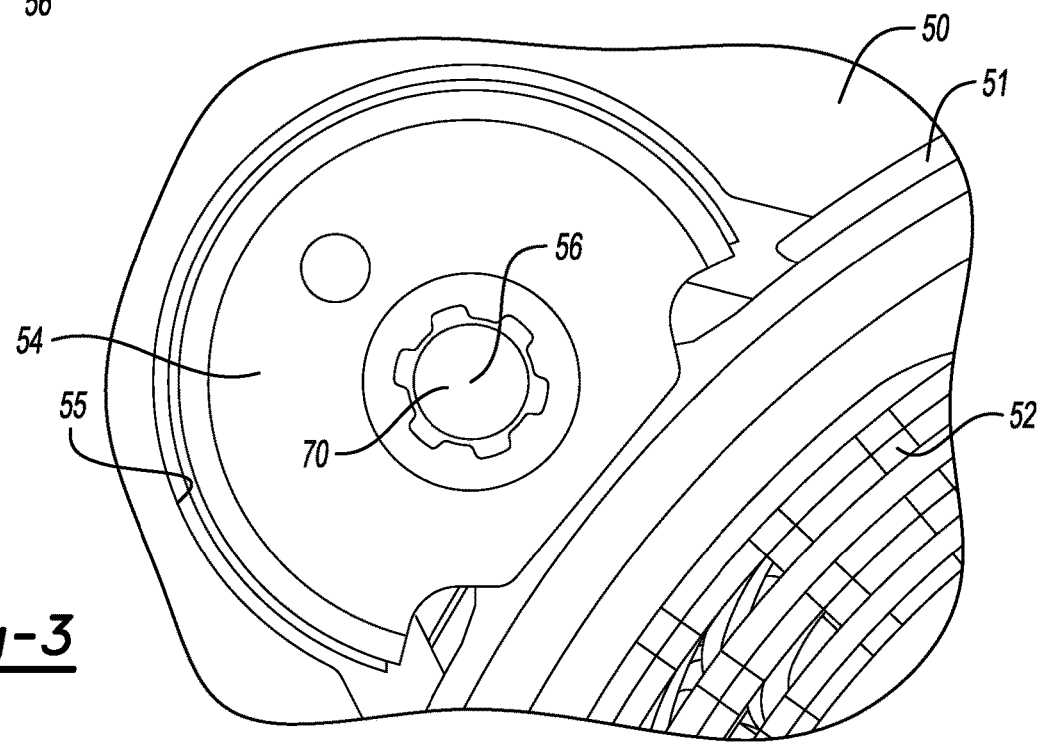
FIG. 3 is a fragmentary plan view of a stator connected to a motor housing with a retainer cap and a bolt.
Figure 4:
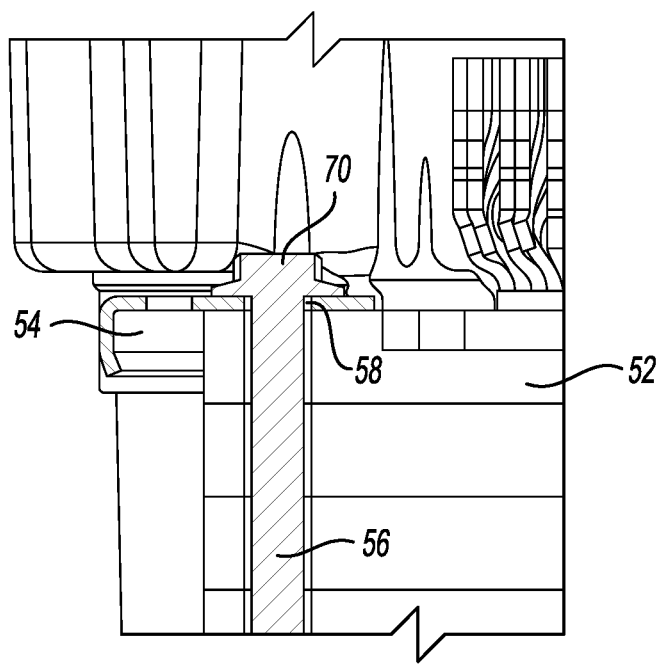
FIG. 4 is a fragmentary view partially in cross-section of a stator connected to a motor housing with a retainer cap and a bolt.

Referring to FIGS. 3 and 4, one retainer cap 54 is shown connecting a portion of the stator 52 to the motor housing 50. The retainer cap 54 is press-fit into a receptacle 55 the motor housing 50 to hold the retainer cap 54 and the stator 52 in the motor housing 50. The retainer cap 54 is assembled to the stator 52 with a bolt 56 that is received in a central opening 58 in the retainer cap 54.

Figure 5:
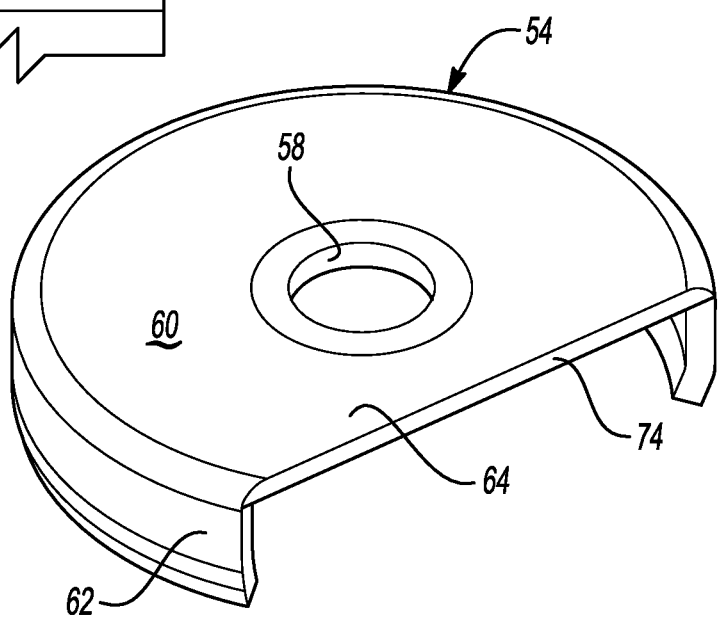
FIG. 5 is a top perspective view of a retainer cap.
Figure 6:
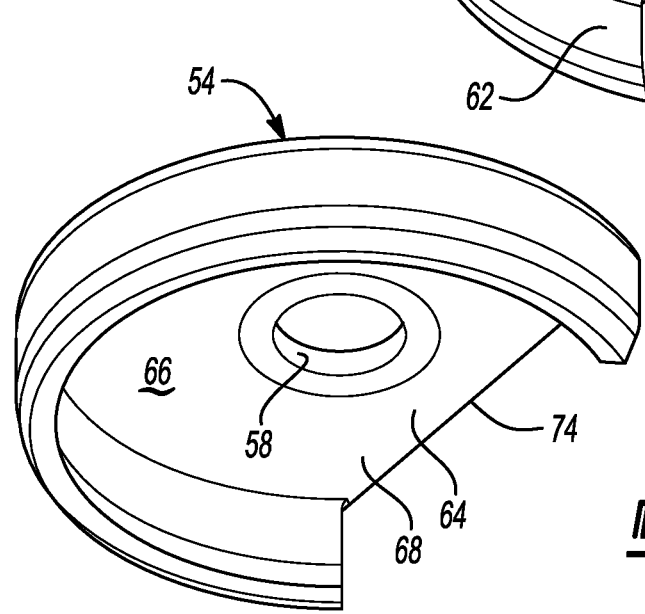
FIG. 6 is a bottom perspective view of a retainer cap.

Referring to FIGS. 5 and 6, the retainer cap 54 is shown in two different perspective views. In FIG. 5, the outer surface 60 of the retainer cap 54 is shown extending between and interconnecting an outer rim 62 with a washer portion 64. The washer portion 64 defines the central opening 58. In FIG. 6, the inner surface 66 of the retainer cap 54 is shown from the inner side 68, or the side facing the stator 52 (shown in FIGS. 3 and 4). The outer surface 60 of the washer portion 64 around the central opening 58 is adapted to be engaged by the head 70 of the bolt 56 (shown in FIGS. 3 and 4). The inner surface 66 of the washer portion 64 around the central opening 58 is adapted to exert a compressive force on the stator 52.

The outer rim 62 is press-fit into the receptacle 55, that may be a recess or a hole, defined in the motor housing 50 (shown in FIG. 4). The retainer cap 54 and bolt 56 hold the stator 52 in the motor housing 50 and resist deflection of the stator 52 in the radial direction. The retainer cap 54 exhibits substantial stiffness in the radial direction relative to the bolt 56 enough to prevent radial deflection of the stator within the housing and reduce vibration. The retainer cap 54 is configured to accommodate a limited degree of axial flexibility. The flexibility of the washer portion 64 is sufficient to allow flexing in the axial direction to accommodate thermal expansion of the motor housing 50 (shown in FIGS. 2-4).

Outer rim 62 of the retainer cap 54 is truncated, as shown, may incidentally touch the stator 52 depending upon the design, but the side of the stator 52 should not interact with the retainer cap 52. Alignment of the retainer cap 56 with the stator 52 and retention of the stator 52 is provided by the friction between the inner side 68 of the retainer cap 54 and the stator 52.

Figure 7:
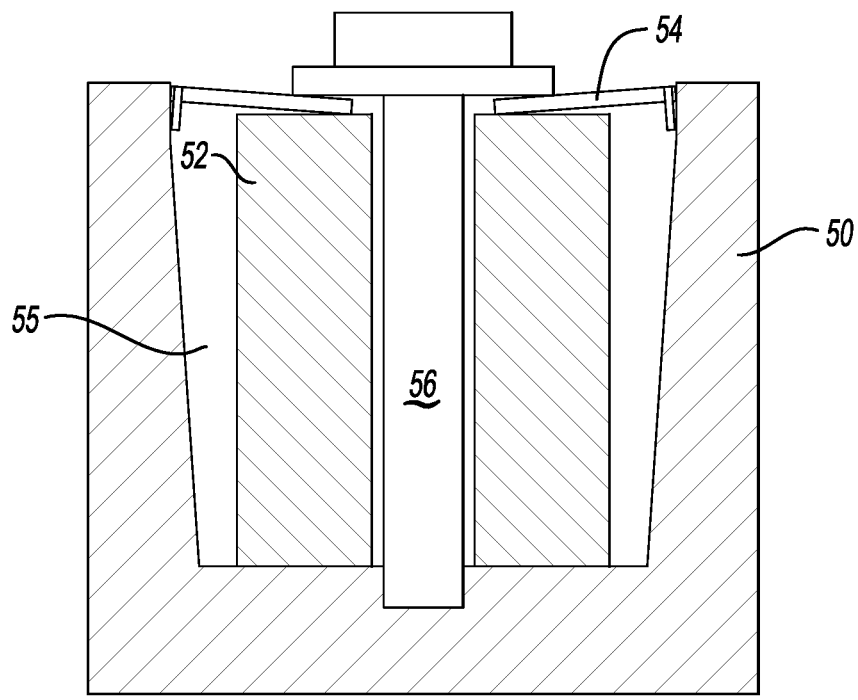
FIG. 7 is a diagrammatic cross-section view of a stator connected to a motor housing with a retainer cap and a bolt when the housing is thermally expanded.

Referring to FIG. 7, one feature of this disclosure is illustrated wherein the retainer cap 54 functions to flex when the motor housing 50 is heated and expands as a result of thermal expansion of the motor housing 50. The motor housing 50 may be made of cast aluminum and the stator 54 is made of steel, or another ferromagnetic material, that have different coefficients of thermal expansion that can cause noise and vibration if an axial space is created between the motor housing 50 and the stator 52.

Figure 8:
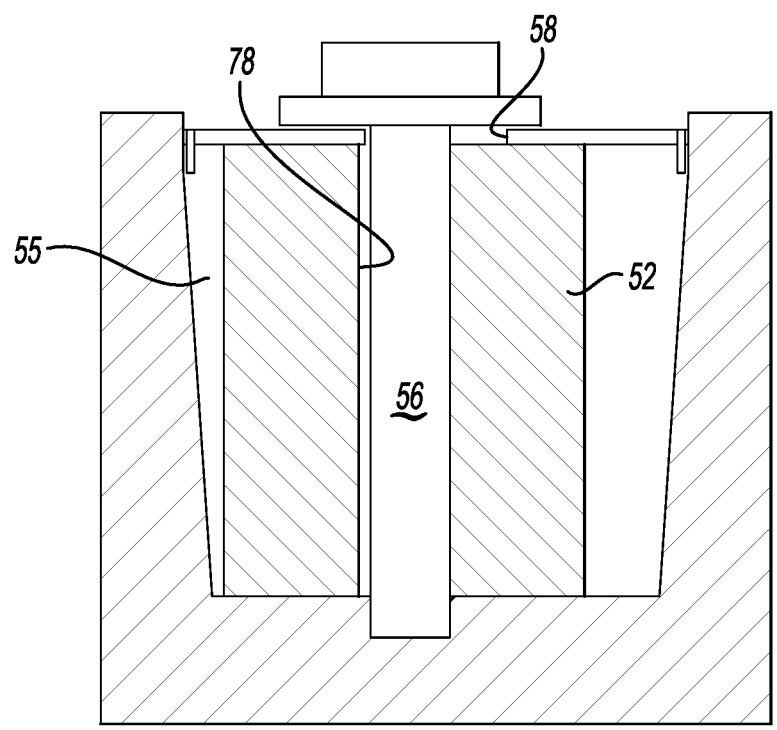
FIG. 8 is a diagrammatic cross-section view of a stator connected to a motor housing with a retainer cap and a bolt stator central opening and the opening defined by the retainer cap offset due to tolerance stack-up.

Referring to FIG. 8, another feature of this disclosure is illustrated wherein misalignment of the bolt 56 and stator 52 are accommodated. A bolt receiving opening 78 in the stator 52 and the central opening 58 defined by the retainer cap 54 may be misaligned due to tolerance stack-up in production. Clearance is provided between the bolt 56 and the bolt receiving opening 78 in the stator 52 and is also provided between the bolt 56 and the central opening 58 defined by the retainer cap 54. FIG. 8 illustrates a maximum misalignment condition of the bolt receiving opening 78 and central opening 58 in the retainer cap 54.

Referring to FIGS. 9A-9C, the process is illustrated for assembling the stator 52 to the motor housing 50 with the retainer cap 54 and the bolt 56. In FIG. 9A, the stator is first positioned in the receptacle 55 in the motor housing 50 and the retainer cap 54 and bolt 56 are staged to be connected to the motor housing 50 and the stator 52 in a press 80.

Referring to FIG. 9B, the press 80 is shown pressing the retainer cap 54 into the receptacle 55 in the motor housing 50 and presses against the stator 52.

Referring to FIG. 9C, a socket 82 disposed inside the press engages the head 70 of the bolt 56 to tighten the bolt 56 thereby securing the retainer cap 54 against the stator 52 and the stator 52 inside the cavity 51 of the motor housing 50.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A motor for an electric vehicle comprising;
  a motor housing defining a plurality of receptacles for receiving one of a plurality of bolts that each include a head;
  a stator disposed in the motor housing and defines a plurality of openings; and
  a plurality of caps each have an outer rim and a washer portion defining a bolt receiving opening, the outer rims of the caps are each attached to one of the plurality of receptacles in the motor housing, the caps are each attached to the stator by one of the bolts, the heads of the bolts clamp the cap to the stator to frictionally retain one end of the stator, and the outer rim holds the cap in the motor housing while the washer portion flexes axially in response to thermal expansion and contraction of the motor housing.

2. The motor of claim 1 wherein each outer rim includes a partially cylindrical wall, wherein the bolt receiving openings are concentric with the partially cylindrical wall.

3. The motor of claim 2 wherein the partially cylindrical wall and the washer portion are truncated on one side of each cap to provide a clearance between the retainer cap and the stator.

4. The motor of claim 1 wherein a first clearance is provided between each bolt receiving opening and each of the bolts, a second clearance is provided between each bolt and the plurality of openings, and wherein the first and second clearances are provided to accommodate misalignment between the stator and the motor housing to prevent the cap from tilting the stator off-center.

5. The motor of claim 1 wherein the outer rim is secured in the plurality of receptacles with a press-fit connection.

6. The motor of claim 1 wherein in response to expansion of the motor housing each cap flexes into one of the receptacles while the heads of the bolts maintain a clamp load against the stator.

7. The motor of claim 1 wherein bolt heads each frictionally engage an external surface of one of the washer portions and an inner surface of each of the washer portions frictionally engage the stator.

8. An electric vehicle comprising:
  a vehicle; and
  a motor supported by the vehicle, the motor having—
    a housing defining a plurality of receptacles for receiving one of a plurality of bolts that each include a head,
    a stator disposed in the housing that defines a plurality of openings, and
    a plurality of caps each having an outer rim and a washer portion defining a bolt receiving opening, the outer rim of each cap is attached to one of the receptacles in the housing, wherein the caps are attached to the stator by one of the plurality of bolts with the heads of the bolts clamping the cap to the stator to frictionally retain one end of the stator, and the outer rim holds the cap in the motor housing while the washer portion flexes axially in response to thermal expansion and contraction of the housing.

9. The electric vehicle of claim 8 wherein the outer rim includes a partially cylindrical wall, wherein the plurality of receptacles is concentric with the partially cylindrical walls.

10. The electric vehicle of claim 9 wherein the partially cylindrical walls and the washer portions are truncated on one side of the caps to provide a clearance relative to the stator.

11. The electric vehicle of claim 8 wherein a first clearance is provided between the receptacles and each of the bolts, a second clearance is provided between each bolt and the plurality of openings, and wherein the first and second clearances are provided to accommodate misalignment between the stator and the motor housing to prevent the cap from tilting the stator off-center.

12. The electric vehicle of claim 8 wherein the outer rims are secured in one of the plurality of receptacles with press-fit connections.

13. The electric vehicle of claim 8 wherein the caps flex into the respective plurality of receptacles while the heads of the bolts maintain a clamp load against the stator in response to expansion of the motor housing.

14. The electric vehicle of claim 8 wherein bolt heads each frictionally engage an external surface of one of the washer portions and an inner surface of each of the washer portions frictionally engage the stator.

15. A method of assembling a motor comprising:
assembling a stator into a cavity defined by a motor housing, the motor housing defining a plurality of threaded holes;
assembling a plurality of bolts to a plurality of caps, wherein the caps each define a bolt receiving opening;
inserting the bolts and caps into a plurality of stator mounting openings provided on the stator;
pressing each of the caps into one of the stator mounting openings with a press; and
securing the caps to the stator by tightening each of the bolts into one of the threaded holes.

16. The method of claim 15 wherein during the securing step the press holds the caps against the motor housing.

17. The method of claim 15 wherein the caps are secured by a press-fit inside the stator mounting openings.

18. The method of claim 15 wherein the bolts each have a head that frictionally engages an external surface of one of the caps, and wherein an inner surface of one of the caps frictionally engages the stator.

19. The method of claim 15 wherein the caps are shaped on one side to define an edge that conforms to a portion of the stator.

20. The method of claim 15 wherein a first clearance is provided between the bolt receiving openings and each of the bolts, a second clearance is provided between each bolt and each stator mounting opening, and wherein the first and second clearances are provided to accommodate misalignment between the stator and the motor housing to prevent the cap from tilting the stator off-center.

* * * * *